No. 611,195. Patented Sept. 20, 1898.
A. C. BUTLER.
SCRAPER FOR CULTIVATORS.
(Application filed Mar. 8, 1898.)
(No Model.)
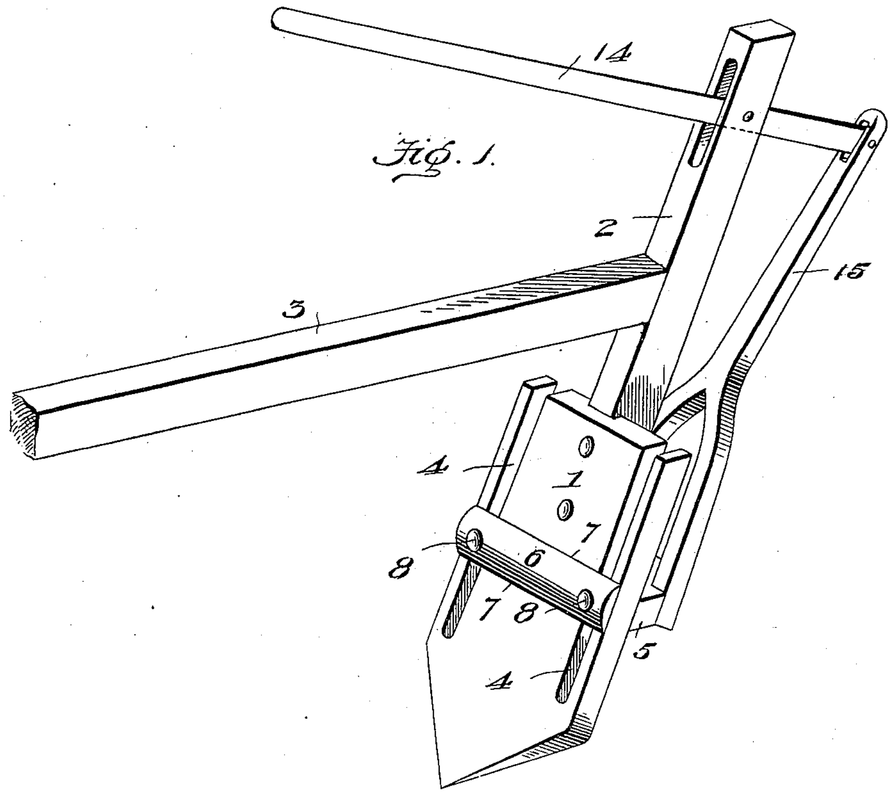
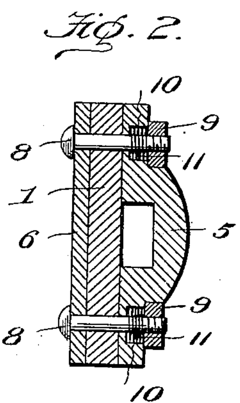
Inventor
A. C. Butler
Witnesses
by
A. B. Willson & Co.
Attorneys
THE NORRIS PETERS CO., PHOTO-LITHO., WASHINGTON, D. C.

UNITED STATES PATENT OFFICE.

ALBERT C. BUTLER, OF TIMPSON, TEXAS, ASSIGNOR OF ONE-HALF TO JAMES B. BUTLER AND HENRY C. BUTLER, OF SAME PLACE.

SCRAPER FOR CULTIVATORS.

SPECIFICATION forming part of Letters Patent No. 611,195, dated September 20, 1898.

Application filed March 8, 1898. Serial No. 673,123. (No model.)

*To all whom it may concern:*

Be it known that I, ALBERT C. BUTLER, a citizen of the United States, residing at Timpson, in the county of Shelby and State of Texas, have invented certain new and useful Improvements in Scrapers for Cultivators, &c.; and I do declare the following to be a full, clear, and exact description of the invention, such as will enable others skilled in the art to which it appertains to make and use the same.

My invention has relation to scrapers for cultivator-shovels, plows, and like tilling implements; and the object is to provide a device of this character which shall be simple of construction, durable in use, comparatively inexpensive of production, and which will be self-sharpening and self-adjusting to compensate for wear.

With this object in view the invention consists in the construction, combination, and arrangement of the several parts of the device, as will be hereinafter fully described and claimed.

In the accompanying drawings, Figure 1 is a perspective view of a cultivator-shovel, illustrating my invention; and Fig. 2 is a transverse sectional view through the scraper, shovel, and sliding block.

In said drawings, 1 denotes a cultivator-shovel, 2 the stock, and 3 the beam. The shovel is provided with two longitudinal slots 4 adjacent to the side edges.

5 denotes a sliding block, and 6 my improved scraper, which is adapted to slide up and down on the face of the cultivator-shovel to remove therefrom any soil that may cling to the shovel. This scraper is preferably oval and has cutting edges 7. The scraper is connected to the block by two bolts 8, which pass through the longitudinal slot and the block and are provided at their free ends with nuts 9. The holes in the blocks are counterbored, as shown at 10, and in these counterbores are seated stiff coiled springs 11, the rear end of which engages the shovel of the counterbores and the forward ends of which engage adjusting-nuts 9. It will thus be seen that the springs are confined between the nuts 9 and the shoulder of the bore and exert their energy to draw the scraper tightly against the face of the cultivator-shovel, thereby automatically compensating for wear, and by reason of establishing this frictional contact the cutting edges of the scraper are always kept sharp, for as they wear the edges are beveled off to a point, due to the oval shape of the scraper.

14 denotes an operating-lever pivoted to the stock, and 15 denotes a link connecting the operating-lever to the block, whereby when the operating-lever is reciprocated the scraper will be moved up and down in engagement with the face of the cultivator-shovel, thus keeping the same clean and smooth.

While I have shown my invention as applied to a cultivator, I would have it distinctly understood as falling within the scope of my invention the application of the scraper as thus described to any tilling implement adapted to be drawn through the ground for the purpose of plowing or cultivating the soil.

Having thus described my invention, what I claim, and desire to secure by Letters Patent, is—

1. The combination with the blade, shovel or moldboard of a tilling implement provided with vertical slots, of a scraper, a sliding block, bolts extending through the scraper, the slots and the sliding blocks, springs for drawing the scraper against the face of the implement, and means for reciprocating the scraper, substantially as set forth.

2. The combination with a tilling-shovel having vertical slots, a scraper, a sliding block having bolt-holes provided with counterbores, bolts connecting the scraper with the block, springs seated in said counterbores, nuts on said bolts between which and the shoulders of the counterbores the springs are confined, and nuts upon the extreme end of the bolts, an operating-lever, and a link connecting the operating-lever with the sliding block, substantially as set forth.

In testimony whereof I have hereunto set my hand in presence of two subscribing witnesses.

A. C. BUTLER.

Witnesses:
H. C. BUTLER,
W. D. HEATON.